E. R. Cheney,
Making Horseshoe Calks,
N° 80,807. Patented Aug. 11, 1868.
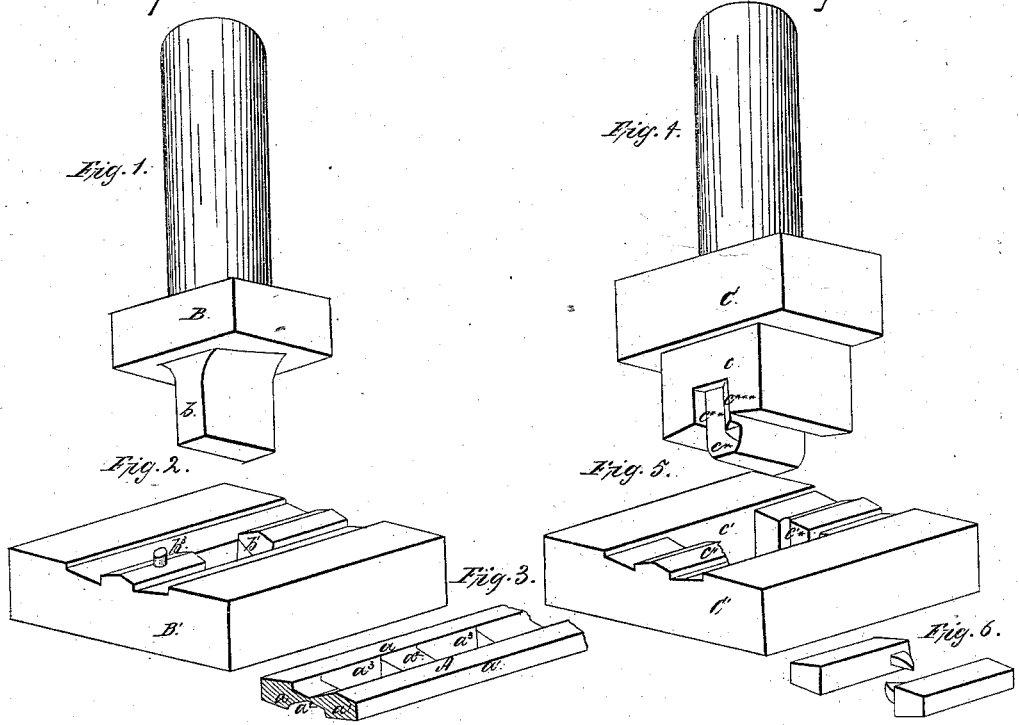
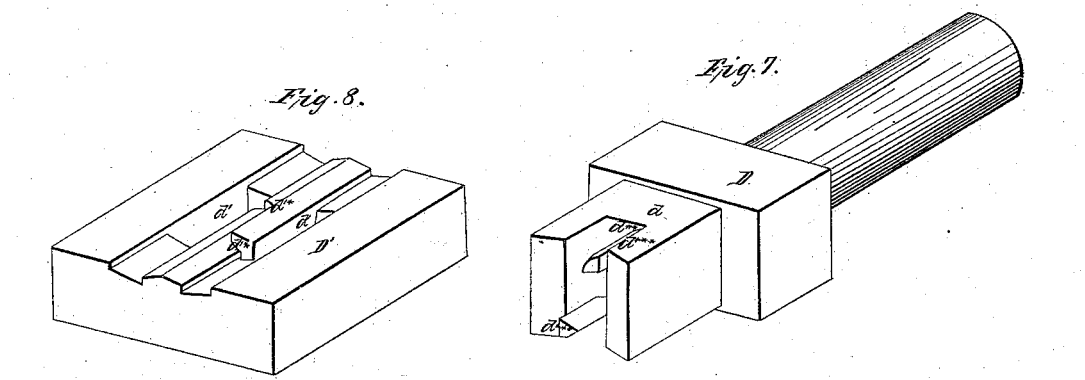
Witnesses:
W. B. Denning
J. E. M. Bowen
Inventor:
E. R. Cheney
By Knight Bros
Attorneys

United States Patent Office.

ETHAN R. CHENEY, OF SOUTH BOSTON, MASSACHUSETTS.

Letters Patent No. 80,807, dated August 11, 1868.

---

IMPROVED DIE FOR MAKING TOE-CALKS FOR HORSE-SHOES.

---

The Schedule referred to in these Letters Patent and making part of the same.

---

TO ALL WHOM IT MAY CONCERN:

Be it known that I, ETHAN R. CHENEY, of South Boston, in the county of Suffolk, and State of Massachusetts, have invented certain new and useful Dies for Cutting Toe-Calks for Horse-Shoes; and I do hereby declare the following to be a full, clear, and exact description thereof, reference being had to the accompanying drawings, which are made a part of this specification.

My invention relates to a novel construction of dies for forming toe-calks for horse-shoes.

The bar used is of I-form, in transverse section, and being placed in any disk, is cut at one or more operations, as may be preferred, into the desired form of calk, two being simultaneously produced from each length.

In the drawings—

Figures 1 and 2 represent, in perspective, the male and female dies for performing the first part of the operation, as done by two sets of dies.

Figure 3 is a perspective view of the bar as it comes from said dies.

Figures 4 and 5 represent, in perspective, the male and female finishing-dies, and Figure 6, a perspective view of two finished calks in the relative position they are cut from the bar.

Figures 7 and 8 represent, in perspective, the male and female dies for cutting the complete calks from the bar at one operation.

The bar of metal, A, is produced by rolling, in the usual way, of the form represented in fig. 3, except the perforation; and consists of two pentagonal portions or ribs $a$ $a^1$, joined by a double concave diaphragm or web, $a^2$. This form adapts it to cut the calks with the greatest advantage, two being produced from each length, with their "steady-pins" both formed from the diaphragm.

In the set of dies represented, for forming the calks at two operations, (the preferred mode,) B represents the male, and B' the female punching-die, and C the male, and C' the female finishing-die. The cutting-part or bit $b$ of the die B is of rectangular form, of such length and width as to adapt it to cut away the diaphragm $a^2$ of the bar the distance required between the "steady-pins" of two calks, and enters an aperture, $b^1$, of corresponding form in the die B'. A stop, $b^3$, being provided against the bar A, is placed to regulate the postion of the apertures $a^3$ made by said bit. The face or upper surface of the die B', as of each of the other female dies, is provided with ribs and depressions to match the surface of the bar A, said surface of the die being, if preferred, slightly depressed in the centre, so as to bend the bar transversely somewhat, to facilitate cutting it. The bit $c$ of the die C is of sufficient width to cut entirely across the bar, and of the same length as the calks it is to produce. It is slightly concave, or inwardly bevelled, to adapt it to cut off the metal more easily, and is provided with a downward projection, $c^*$, slightly tapered, which enters the aperture $a^3$ in the bar, formed by the dies B B', and thus holds the bar in a proper position to have the calks removed by the cutting-edges of the bit. It also serves to support the "steady-pins" of the calks while they are being formed. At each end of the projection $c^*$ the bit is provided with a rectangular recess, $c^{}$, having in one of its corners a segmental cutter, $c^{*}$, projecting a sufficient distance below the surface of the bit proper, to form the "steady-pins," before the calks are severed. The die C' has formed in it a recess, $c^1$, of corresponding outline to the bit $c$, for the reception of said bit; it being of rectangular form, with convexities or fillets $c'^*$, of corresponding form to the recesses $c^{}$ at each end. The cutters $c^{*}$ are located on opposite sides of the bit, and form the "steady-pins" of the shape and in the relative position represented in fig. 6.

In the form of dies represented in figs. 7 and 8, the calks are cut complete from the bar, at one operation, by substantially the same means employed in the form described above, combined in one pair of dies. D represents the male, and D' the female die. The former has a bit, $d$, of the same form as that, $c$, of the finishing-die of the before-described set, except that instead of the projection $c^*$, it has a recess, $d^{}$, corresponding with $c^{}$, and extending entirely across its face longitudinally.

The cutters $d^{*}$ for forming the "steady-pins" are formed in the recess $d^{}$, in the same relative position as those of C.

Rectangular apertures $d'\ d'$, having inwardly-projecting notches $d'^*\ d'^*$ arranged at their opposite ends, are provided in the die $D'$, for the reception of the bit $d\ d^{}\ d^{*}$.

The bar being placed in these dies, has cut from it, at each operation, two complete calks, in the same relative position as those formed by the dies B and C, leaving the waste in a continuous strip.

I propose, in practice, to construct the female dies with a face sufficiently concave in its longitudinal plane to impart to the calks the proper curve to match that of the shoe.

The different dies may be mounted and operated in any suitable manner.

Having thus described my invention, I claim as new therein, and desire to secure by Letters Patent—

The dies B B' and C C', or their equivalent, constructed and operating substantially as described for the purpose specified.

ETHAN R. CHENEY.

Witnesses:
SYLVESTER M. FOSDICK,
WM. B. HARDING.